Nov. 26, 1935.   W. WEIS   2,022,626

COUPLING

Filed March 14, 1935

INVENTOR.
William Weis
BY Bohleber & Ledbetter
ATTORNEYS.

Patented Nov. 26, 1935

2,022,626

UNITED STATES PATENT OFFICE 2,022,626

COUPLING

William Weis, New York, N. Y., assignor to Certified Flexible Couplings, Inc., a corporation of New York Application March 14, 1935, Serial No. 10,985

8 Claims. (Cl. 64—14)

The invention relates to a coupling by means of which two shafts in end to end relation may be coupled together even though there may be some angular, spaced, or a combination of angular and spaced misalignment between the axes of the shafts. The invention relates particularly to the use of a single resilient member between the driving and driven parts of the coupling.

It is an object of the invention to devise a simple coupling utilizing a single cushion member between the driving and driven parts of the coupling and which coupling is capable of connecting shafts which may be in angular, spaced, or a combination of angular and spaced misalignment.

Another object of the invention is to provide a new and novel coupling which is quiet and efficient in operation so that the eventual vibrations, shocks and impacts are absorbed without producing any undesirable heat.

Another object of the invention is to devise a coupling which is compact and durable and in which the resilient member is submitted to compression exclusively.

Another object of the invention is to provide a coupling which can be easily mounted and aligned.

Other objects of the invention will be more apparent from the following description taken in connection with the accompanying drawing showing the preferred embodiment of the invention, in which.

Figure 1:
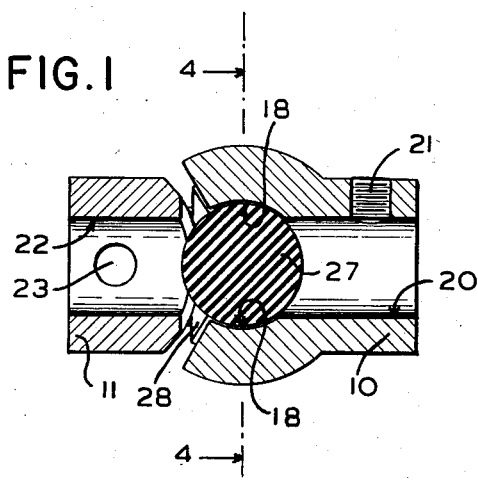
Figure 1 is a longitudinal section through the coupling.
Figure 2:
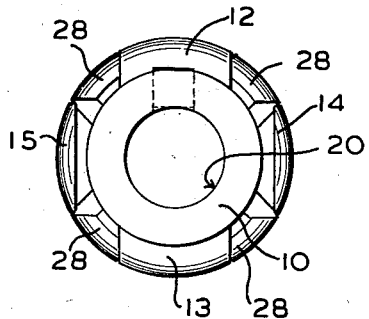
Figure 2 is an end view of the coupling.
Figure 3:
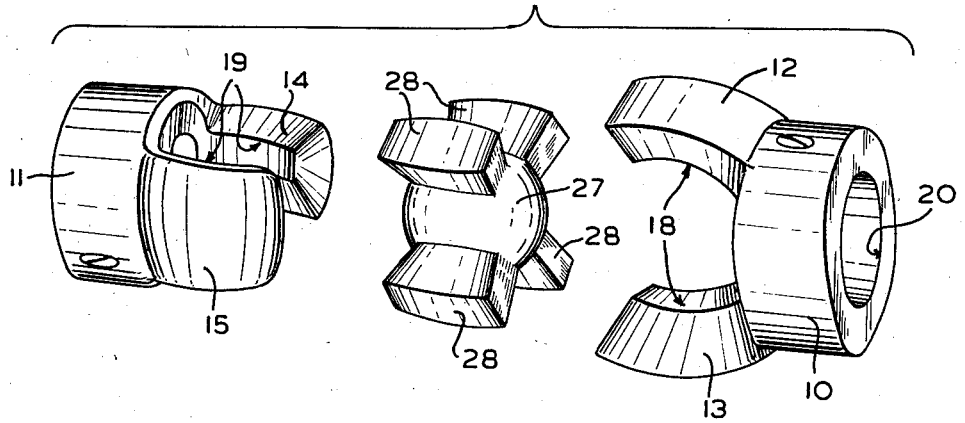
Figure 3 is an exploded perspective view of the coupling with the parts in spaced relation preparatory to their being assembled together.
Figure 4:
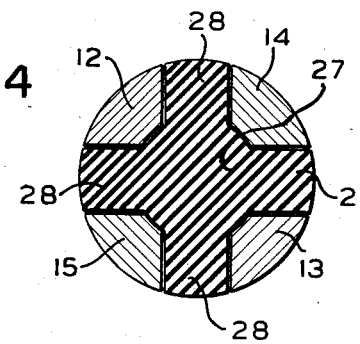
Figure 4 is a cross section taken on line 4—4 of Figure 1.
Figure 5:
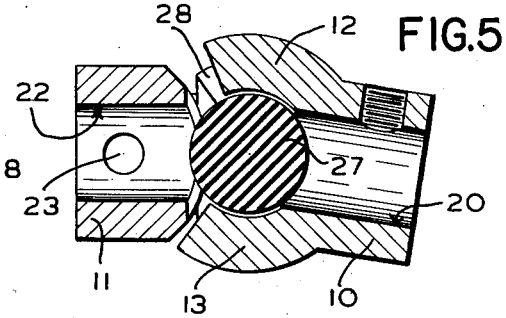
Figure 5 is a sectional view similar to Figure 1, but showing the position of the coupling parts for angular misalignment.

Shaft couplings are known in which a resilient cushion member is provided between the driving and driven parts of the coupling. Couplings with such cushion members, however, have not provided for the three manners in which shafts may be misaligned, namely, angular, spaced, or a combination of angular and spaced misalignment, nor provided for such misalignment of shafts to the same degree as is provided by the construction to be described herein.

The shaft coupling comprises a pair of members, preferably of metal, such as the members 10 and 11. Each member has a pair of projecting arms or fingers, such as the arms 12 and 13 of the member 10 and arms 14 and 15 of the member 11. The inner portion or surface 18 of each arm is circular in a plane passing through the axis of the member 10 or shaped so as to permit angular misalignment with a center member to be described. The inner portion or surface 19 of each arm of the member 11 is similarly circular or shaped as described for the member 10. It will be noted also that the arms preferably extend beyond a semi-circle.

The member 10 preferably is provided with a bore 20 to receive the end of the shaft which is secured therein by the set screw 21. A shaft is similarly secured in the bore 22 of the member 11 by a set screw 23.

The single rubber cushion member 27 has two grooves spaced at right angles from each other, thereby forming uniformly spaced projections 28. The bottoms of the grooves are circular in a plane in the axis of the cushion member or shaped so as to permit angular misalignment with the projecting portions of the pair of members and have a diameter or dimension substantially the same as that of the inner portion 18 and 19 of the arms. The circular or shaped contour of the inner portion of the arms and of the cushion member 27 enables the armed members 10 and 11 to assume angular misalignment with respect to each other.

A certain amount of clearance may be provided between the arms and the cushion member so that spaced misalignment, or a combination of spaced and angular misalignment may be provided for. In lieu of such clearance, the resiliency of the cushion member alone may be relied upon, if this member is sufficiently resilient to yield under the pressure which would be exerted thereupon by two shafts not in exact alignment. The clearance construction is preferred, however, because reliance solely upon the resiliency of the cushion member would tend to create heat therein and probably render the coupling slightly less efficient. With the arms of each member received in one of the grooves, the projections provide a cushion between the interlaced arms or fingers of the driving and driven member.

Preferably the inner portions or surfaces 18 and 19 of the arms of the coupling members 10 and 11 are spherical in shape. The center portion of the single cushion member is at least partially spherical and preferably takes the form of a complete sphere extending axially beyond the projections 28 so that a resilient abutment is provided against longitudinal movement between the members towards each other. Although this abutment is minimized somewhat by the fact that the shaft bores 20 and 22 extend through the member, there is no real need for these bores extending completely therethrough. If the bore extends only partially into the respective member, the spherical center of the single cushion member 27 has much more contact for abutment against longitudinal movement.

Since the arms of each coupling member extend beyond a semi-circle, it is necessary to press the coupling members 10 and 11 upon the cushion member 27. This semi-circle of the arms is not so great, however, that it is not capable of easily compressing the center portion of the groove merely by ordinary pressure. When so pressed into position, the coupling remains assembled and may be easily disassembled merely by pulling it apart. Also in the preferred form of the coupling, the side walls of the projections 28 on the single cushion member 27 are parallel.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing.

What is claimed is:

1. A shaft coupling comprising a pair of members each having a pair of projecting portions, the inner portion of each arm of the members being shaped to permit angular misalignment, a single rubber cushion member having two grooves therein at substantially right angles to each other forming uniformly spaced projections extending radially, the bottom of the grooves being shaped to permit angular misalignment of the members thereupon and having a dimension substantially that of the inner portion of the arms, and each groove receiving the arms of one of the members so that the projections form a cushion between the arms of the members.

2. A shaft coupling comprising a pair of members each having a pair of projecting arms, the inner portion of each arm of the members being circular in a plane including and parallel to the axis of each member, a single rubber cushion member having two grooves therein at right angles to each other forming uniformly spaced projections extending radially, the grooves being circular in a plane in the axis of the cushion member and having a diameter substantially that of the circular inner portion of the arms, and each groove receiving the arms of one of the members so that the projections form a cushion between the arms of the members.

3. A shaft coupling comprising a pair of members each having a pair of projecting arms, the inner portion of each arm of the members being circular in a plane including and parallel to the axis of each member, the circular portion being greater than a semi-circle, a single rubber cushion member having two grooves therein at right angles to each other forming uniformly spaced projections extending radially, the grooves being circular in a plane in the axis of the cushion member and having a diameter substantially that of the circular inner portion of the arms, and the arms of each member being pressed into one of the grooves so that the projections form a cushion between the arms of the members.

4. A shaft coupling comprising a pair of members each having a pair of projecting arms, the inner portion of each arm of the members being circular in a plane including and parallel to the axis of each member; and a single rubber cushion member having a center circular portion corresponding substantially with the diameter of the circular inner surfaces of the arms, and four projections extending radially from the center portion and uniformly spaced thereupon, the arms of the members being received in the spaces between projections of the single cushion member.

5. A shaft coupling comprising a pair of members each having a pair of projecting arms, the inner portion of each arm of the members being circular in a plane including the axis of each member and in planes parallel thereto; and a single rubber cushion member having a center spherical portion corresponding substantially with the diameter of the circular inner surfaces of the arms, and four projections extending radially from the center portion and uniformly spaced thereupon, the arms of the members being received in the spaces between projections of the single cushion member.

6. A shaft coupling comprising a pair of members each having a pair of projecting arms, the inner portion of each arm of the members being circular in a plane including the axis of each member and in planes parallel thereto; and a single rubber cushion member having a center spherical portion corresponding substantially with the diameter of the circular inner surfaces of the arms, and four projections extending radially from the center portion and uniformly spaced thereupon, the spherical portion extending beyond the ends of the projections to provide a longitudinal cushion abutment, the arms of the members being received in the spaces between projections of the single cushion member.

7. A shaft coupling comprising a pair of members each having a pair of projecting arms, the inner portion of each arm of the members being circular in a plane including the axis of each member and in planes parallel thereto, the circular portion being greater than a semi-circle in order to retain the parts together, and a single rubber cushion member having a center spherical portion corresponding substantially with the diameter of the circular inner surfaces of the arms, and four projections extending radially from the center portion and uniformly spaced thereupon, the arms of the members being received in the spaces between projections of the single cushion member.

8. A shaft coupling comprising a pair of members each having a pair of projecting arms, the inner portion of each arm of the members being a spherical surface, and a single rubber cushion member having a center spherical portion corresponding substantially with the diameter of the inner spherical surfaces of the arms, and four projections extending radially from the center portion and uniformly spaced thereupon, the projections having parallel radially extending sides in order to permit spaced misalignment between the axis of the members, the arms of the members being received in the spaces between projections of the single cushion member.

WILLIAM WEIS.